United States Patent
Seto

(10) Patent No.: US 6,994,392 B2
(45) Date of Patent: Feb. 7, 2006

(54) FUEL LID APPARATUS

(75) Inventor: Naoya Seto, Yokohama (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 11/094,193

(22) Filed: Mar. 31, 2005

(65) Prior Publication Data

US 2005/0230999 A1  Oct. 20, 2005

(30) Foreign Application Priority Data

Mar. 31, 2004 (JP) .............................. 2004-107843

(51) Int. Cl.
*B62D 25/00* (2006.01)
(52) U.S. Cl. ........... 296/97.22; 296/155; 292/DIG. 446
(58) Field of Classification Search ............ 296/97.22, 296/151, 146.4, 155; 292/DIG. 46
See application file for complete search history.

(56) References Cited

U.S. PATENT DOCUMENTS 6,808,226 B2 * 10/2004 Hirano ...................... 296/155

FOREIGN PATENT DOCUMENTS

JP   2001-241239 A    9/2001
JP   2004346542 A  * 12/2004

* cited by examiner

*Primary Examiner*—Jason Morrow
(74) *Attorney, Agent, or Firm*—Sughrue Mion, PLLC

(57) ABSTRACT

A fuel lid apparatus for an automotive vehicle having a slide door. The fuel lid apparatus includes a push rod displaceable in a first direction by opening a fuel lid under the action of the first biasing device and in a second direction by closing the fuel lid. A link is connected to a stopper for the slide door and capable of moving the stopper to an engaging position by being rotationally moved in a third direction and to a non-engaging position by being rotationally moved in a fourth direction under the action of a second biasing device. In the fuel lid apparatus, the push rod and the second biasing device are in a locational relationship to increase a component force of a biasing force of the second biasing device in the first direction as the push rod is displaced in the first direction.

6 Claims, 6 Drawing Sheets

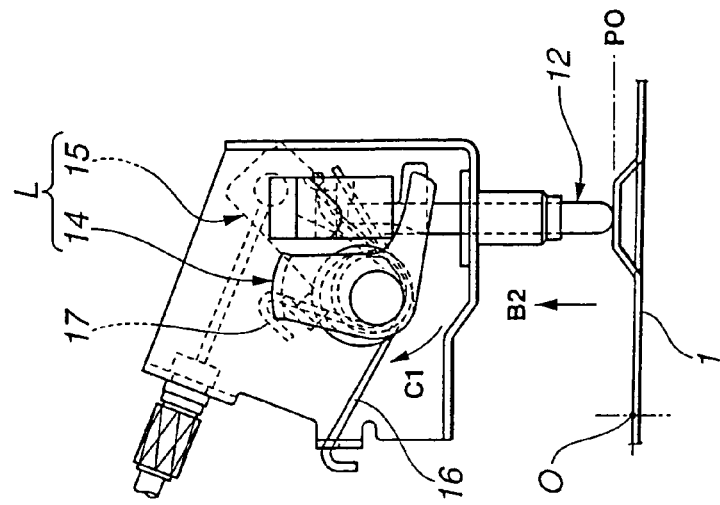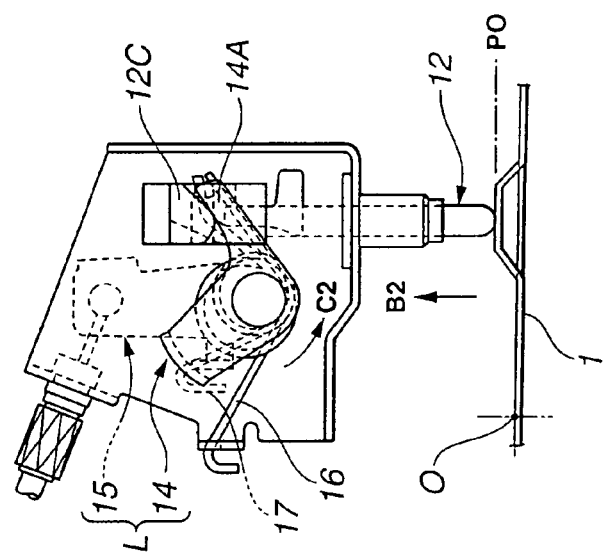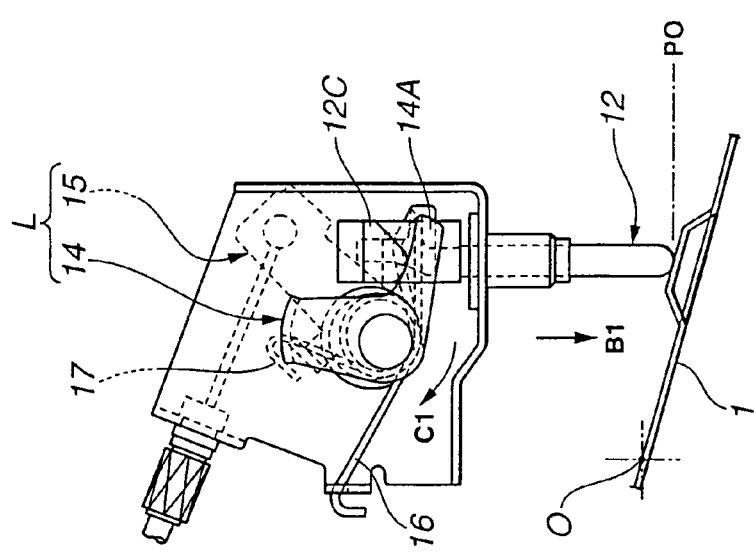

FUEL LID APPARATUS

BACKGROUND OF THE INVENTION

This invention relates to improvements in a fuel lid apparatus for use in an automotive vehicle having a slide door.

In such a fuel lid apparatus used in an automotive vehicle that a fuel lid is placed within a sliding region of a slide door, generally a stopper for the slide door is operated according to the opening and closing actions of the fuel lid. The stopper for the slide door is constructed to allow the slide door to selectively move between an engaging position at which the stopper comes into engagement with the slide door so that the slide door is kept at a partly or half opened position and a non-engaging position at which the stopper does not come into engagement with the slide door so that the slide door can not be kept at the partly or half opened position. When the fuel lid is opened during fuel supply, the fuel lid apparatus moves the stopper to the engaging position so that the slide door can open to the partly or half opened position while the fuel lid is opened. Thus, interference between the slide door and the fuel lid can be prevented, for example, during fuel supply. When the fuel lid is closed, the fuel lid apparatus moves the stopper to the non-engaging position so that the slide door can be fully opened. Usually, such fuel lid apparatus includes a push rod displaceable according to a degree of the opening of the fuel lid. A link is connected to the push rod and rotationally moved following the movement of the fuel lid. A cable is provided to connect the link to the stopper of the slide door installed in a vehicle body.

In such a fuel lid apparatus, it often occurs that the fuel lid is compulsorily closed under a condition where the slide door is kept at the partly or half opened position after the slide door is brought into engagement with the stopper to be put into the partly or half opened position. Under this circumstance, although a force for moving the stopper to the non-engaging position acts to the link by closing the fuel lid, the slide door kept at the partly or half opened position inhibits the stopper from moving to the non-engaging position. Hence, there is a fear that an excessive force acts on the push rod, the link and the cable thereby to deform them.

For solving the above problems, a proposition is made in Japanese Patent Provisional Publication No. 2001-241239, in which a fuel lid apparatus includes a link which is constituted of first and second links which are relatively rotatable. The first link is connected to the push rod and pushes the push rod in the direction to open the fuel lid, upon receiving a biasing force from a first spring. The second link is connected through a cable to a stopper. Additionally, the first and second links are relatively rotatably connected to each other through a second spring. In case that a fuel lid is closed so that the force for moving the stopper to the non-engaging position acts on the first link, when the slide door is kept at the partly or half opened position to inhibit the stopper from moving to the non-engaging position, the first and second links make their relative rotation to release an excessive force.

However, drawbacks have been encountered in the above conventional fuel lid apparatus of Japanese Patent Provisional Publication No. 2001-241239. Specifically, although the excessive force can be released by the relative rotation of the first and second links, the number of component parts is unavoidably increased because the link is composed of the two links. Moreover, since the first spring biases the push rod in the direction to open the fuel lid by its elastic restoring force, the elastic restoring force tends to lower to weaken the biasing force to the push rod as the push rod is displaced in the direction to open the fuel lid. Owing to this, there is a fear that the fuel lid can not be rotationally moved with a sufficient force.

SUMMARY OF THE INVENTION

Therefore, an object of the present invention is to provide an improved fuel lid apparatus which can effectively overcome drawbacks encountered in conventional fuel lid apparatus.

Another object of the present invention is to provide an improved fuel lid apparatus that can forcefully and reliably open the fuel lid, avoiding an increase in number of component parts.

According to the present invention, a fuel lid apparatus comprises a push rod displaceable in a first direction by opening a fuel lid and in a second direction by closing the fuel lid. A first biasing device is provided for biasing the push rod in the first direction. A link is connected to a stopper and capable of moving the stopper to an engaging position by being rotationally moved in a third direction and to a non-engaging position by being rotationally moved in a fourth direction. The stopper is adapted to be engaged with a slide door to put the slide door at a partly or half opened position when the stopper is at the engaging position and to be disengaged from the slide door when the stopper is at the non-engaging position. A contacting section is formed in the push rod and capable of being contacted with the link to rotationally move the link in the third direction when the push rod is displaced in the first direction. Additionally, a second biasing device is disposed between the push rod and the link to bias the link in the fourth direction and to bias the push rod in the first direction. In the fuel lid apparatus, the push rod and the second biasing device are in a locational relationship to increase a component force of a biasing force of the second biasing device in the first direction as the push rod is displaced in the first direction.

BRIEF DESCRIPTION OF THE DRAWING

FIG. 4A is an explanatory view showing an operational mode of the fuel lid apparatus of FIG. 1;

FIG. 4B is an explanatory view similar to FIG. 4A but showing another operational mode of the fuel lid apparatus;

FIG. 4C is an explanatory view similar to FIG. 4A but showing further operational mode of the fuel lid apparatus;

DATAILED DESCRIPTION OF THE INVENTION

Figure 1:
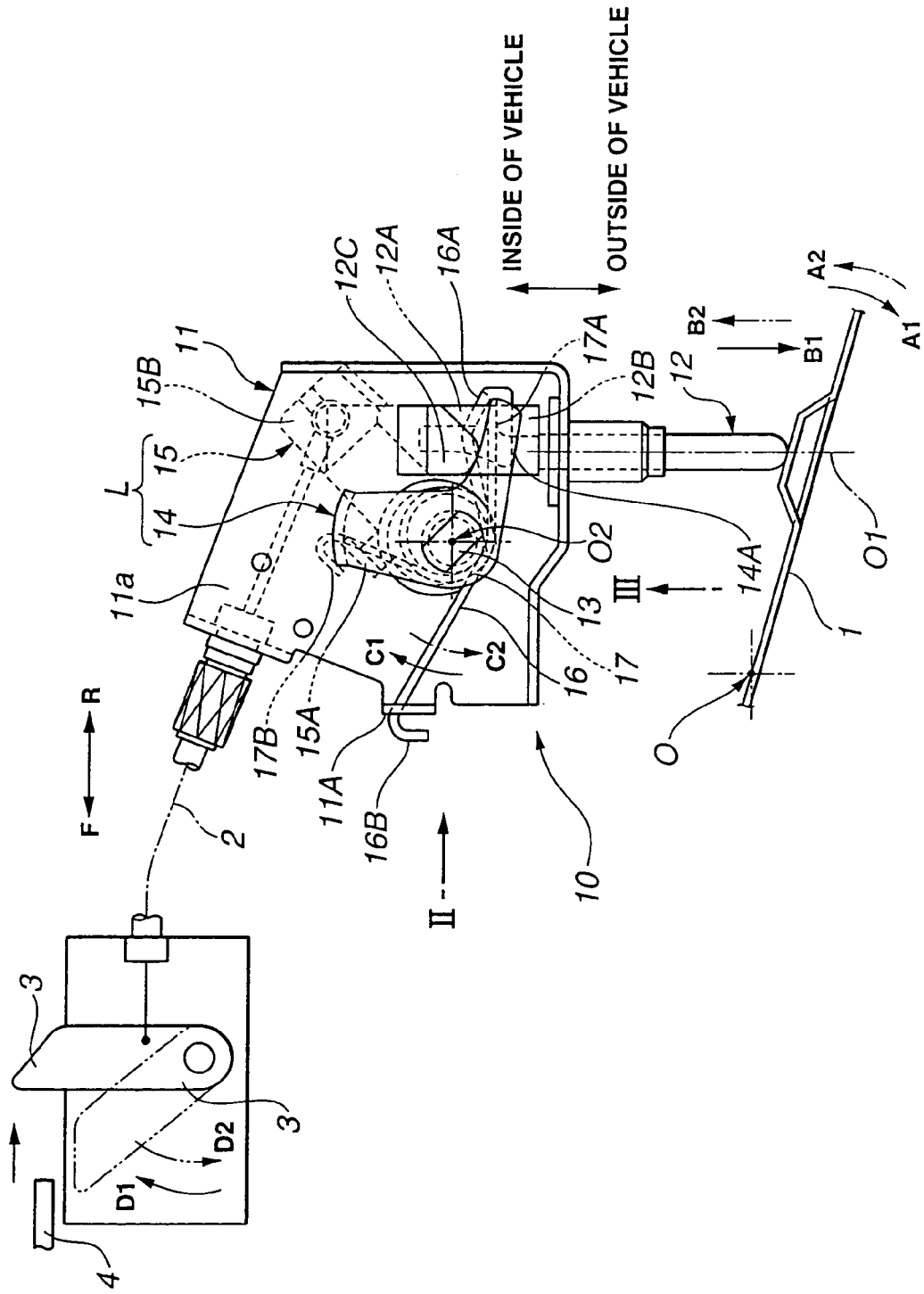
FIG. 1 is a side view of an embodiment of a fuel lid apparatus according to the present invention.
Figure 2:
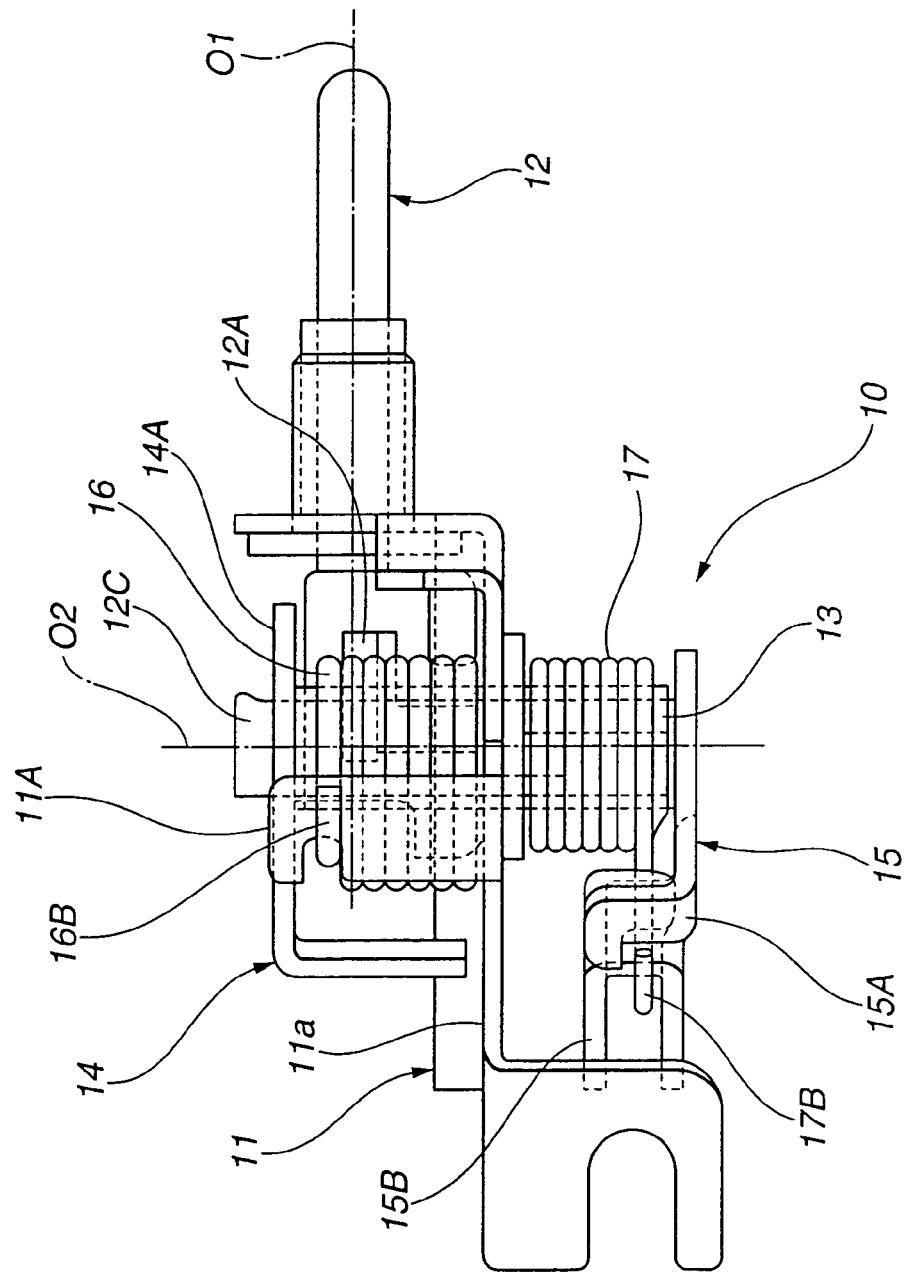
FIG. 2 is an enlarged view as viewed from the direction of arrow II in FIG. 1.
Figure 3:
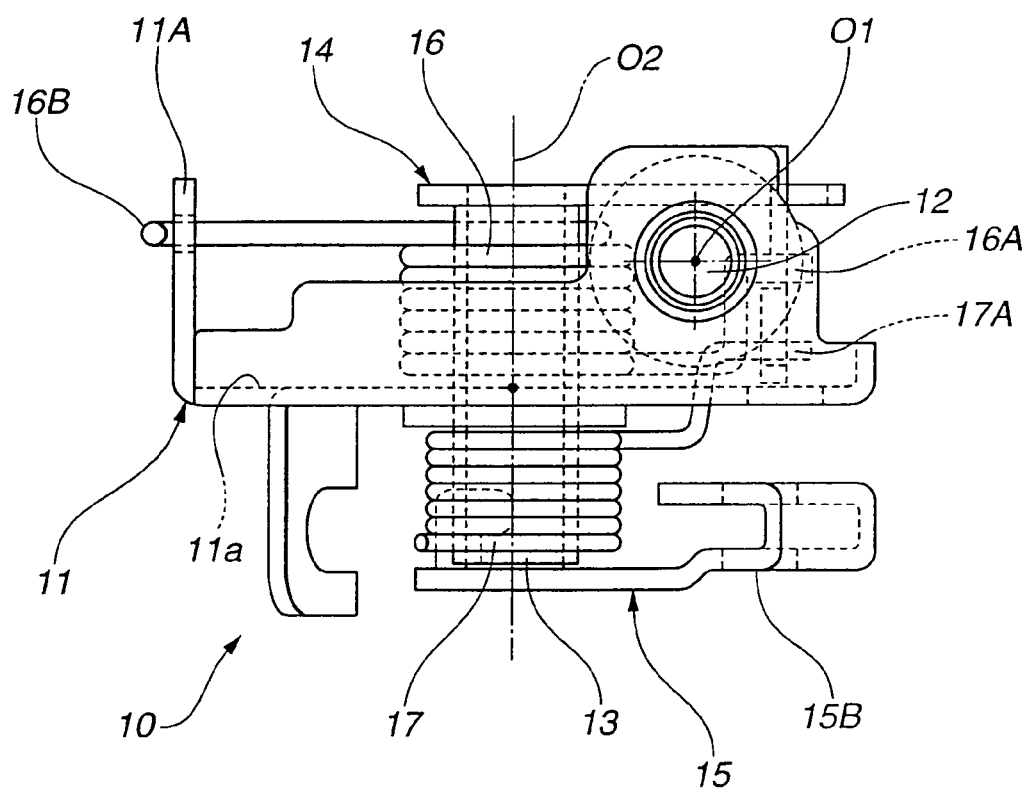
FIG. 3 is an enlarged view as viewed from the direction of arrow III in FIG. 1.

Referring now to FIGS. 1 to 3 of the accompanying drawings, an embodiment of a fuel lid apparatus according to the present invention is illustrated by the reference numeral 10. FIG. 1 is a side view of the fuel lid apparatus 10 according to the present invention. FIG. 2 is an enlarged side view as viewed from the direction of an arrow II in FIG. 1. FIG. 3 is an enlarged side view as viewed from the direction of an arrow III in FIG. 1. Reference characters "F" and "R" denote a front side and a rear side of a vehicle, respectively. The fuel lid apparatus 10 of the present invention is for an automotive vehicle and installed rear of a slide door at a left side of the vehicle body. The fuel lid apparatus 10 includes a bracket 11 which serves as a base member of a main body of the fuel lid apparatus 10 and is mounted at a certain site on the left side of the vehicle body. A push rod 12 is movably installed to the bracket 11 so as to move along its axis O1 extending vertically in FIG. 1. A pin 13 is rotatably installed to the bracket 11 so as to be rotatable about an axis O2 (shown in FIG. 1). A switch lever 14 (as a first link) is fixed to one end of the pin 13, while a stopper lever 15 (as a second link) is fixed to the other end of the pin 13. A main flat section of the bracket 11 is denoted by the reference numeral 11a. As apparent from FIG. 1, the push rod 12 and the switch lever 14 are positioned on one or first side of the main flat section 11a, while the stopper lever 15 is positioned on the other or second side of the main flat section 11a. The pin 13, the switch lever 14, and the stopper lever 15 are connected as a single piece (member), thereby forming a link L which can rotationally move with the pin 13.

A torsion spring or first spring 16 (as a first biasing means or device) is mounted on the pin 13 at the position on the first side of the main flat section 11a. Another torsion spring or second spring 17 (as a second biasing means or device) is mounted on the pin 13 at the position on the second side of the main flat section 11a. One end 16A of the first spring 16 is engaged at an engaging hole 12A formed in an upper end section of the push rod 12, while the other end 16B of the first spring 16 is engaged with an spring engaging section 11A formed in bracket 11, thereby biasing the push rod 12 in the direction of an arrow B1 (a first direction).

One end section 17A of the second spring 17 is engaged with a spring engaging section 12B formed inside the upper end section of the push rod 12. The spring engaging section 12B includes a contacting surface 12B-1 (shown in FIG. 5) which is rounded. The contacting surface 12B-1 is preferably formed as a round surface (more specifically, a generally semicylindrical surface, i.e., a surface forming part of a cylindrical surface). The other end 17B of the second spring 17 is engaged with a spring engaging section 15A formed on the stopper lever 15. Thus the second spring 17 biases the push rod 12 in the direction of the arrow B1 and biases the link L so that the link L rotationally moves in the direction of an arrow C2 (a fourth direction). Due to the above biasing force of the second spring 17, one end or arm section 14A of the switch lever 14 is pressed to a bottom surface of a contacting section 12C formed at the upper end section of the push rod 12.

A lower end of the push rod 12 faces and is contactable with a fuel lid 1 which is rotationally movable about an axis O so as to open in the direction of an arrow A1 and close in the direction of an arrow A2. It will be understood that a fuel supply nozzle is inserted into a fuel inlet of a fuel tank upon opening the fuel lid 1, though not shown. The push rod 12 is biased in the direction of the arrow B1 (the first direction) by the first spring 16 and the second spring 17, so that when a lock (not shown) of the fuel lid 1 is released, the push rod 12 pushes and opens the fuel lid 1 in the direction of the arrow A1. To the contrary, when the fuel lid 1 is closed in the direction of the arrow A2, the push rod 12 is displaced in the direction of an arrow B2 (a second direction) against the biasing force of the first spring 16. The other end section or arm section 15B of the stopper lever 15 is connected through a cable 2 (a connecting member) to a stopper 3. The stopper 3 is provided to a guide rail or the like for a slide door 4.

When the link L rotationally moves in the direction of an arrow C1 (a third direction), the stopper 3 is pulled in the direction of an arrow D1 through the cable 2 and is moved to an engaging position (at which the slide door 4 comes into engagement with the stopper 3) on the moving locus of the slide door 4, as indicated in solid lines in FIG. 1. This limits the moving distance of the slide door 4, thereby putting the slide door 4 at a partly or half opened position. When the link L rotationally moves in the direction of the arrow C2 (a fourth direction), the stopper 3 is rotationally moved in the direction of an arrow D2 and moved to a non-engaging position (at which the slide door 4 does not in engagement with the stopper 3), as indicated in phantom or broken lines in FIG. 1, releasing the moving restriction of the slide door 4. Additionally, a detection switch (not shown) which detects the opening of the fuel lid 1 is turned ON when the switch lever 14 rotationally moves in the direction of the arrow C1 (the third direction).

Operation of the fuel lid apparatus 10 will be discussed with reference to FIGS. 4A to 4C.

As is seen from FIG. 4B, when the fuel lid 1 is closed, the push rod 12 is displaced in the direction of the arrow B2 against the biasing force of the first spring 16. The link L rotationally moves in the direction of the arrow C2 so as to follow an upward movement of the contacting section 12C, while the one end 14A of switch lever 14 is brought into press to contact with the bottom surface of the contacting section 12C formed in the push rod 12 by the biasing force of the second spring 17. Consequently, the stopper 3 moves to the non-engaging position as indicated in broken lines in FIG. 1 so as to release the restriction to the slide door 4.

As is seen from FIG. 4A, the biasing force of the first spring 16 displaces the push rod 12 in the direction of the arrow B1 when the fuel lid 1 is opened. As the contacting section 12C formed in the push rod 12 pushes the one end 14A of switch lever 14 downward, the link L rotationally moves in the direction of the arrow C1. Consequently, the stopper 3 moves to the engaging position as indicated in solid lines in FIG. 1 so that the slide door 4 can be put in the partly opened position. At this time, the detection switch (not shown) is turned ON under the action of the switch lever 14. The second spring 17 keeps the one end 14A of switch lever 14 in a condition to be pressed to the bottom surface of the contacting section 12C formed in the push rod 12 during the downward movement of the push rod 12.

FIG. 4C illustrates a state in which the fuel lid 1 is compulsorily closed under a condition where the slide door 4 is kept at the partly or half opened position after the slide door 4 is brought into engagement with the stopper 3 to be put into the partly or half opened position. Under this condition, the push rod 12 is displaced in the direction of the arrow B2 against the biasing force of the first spring 16 upon closing the fuel lid 1, similarly in the condition of FIG. 4B. However, the slide door 4 is kept at the partly or half opened position inhibiting the stopper 3 from rotationally moving in the direction of the arrow D2 and the link L from rotationally moving in the direction of the arrow C2, so that the link L can not follow the upward movement of the push rod 12. Hence, the one end 14A of switch lever 14 separates from the contacting section 12C of the push rod 12 against the biasing force of the second spring 17. Namely, the push rod 12 is displaced in the direction of the arrow B2 against the biasing force of the second spring 17. Upon this, the compulsory closing movement of the fuel lid 1 is allowed.

When the slide door 4 is moved so that the stopper 3 releases the slide door 4 from restriction to the partly or half opened position, the link L can rotatably move in the direction of the arrow C2. Due to this, the link L is rotationally moved in the direction of the arrow C2 by the biasing force of the second spring 17, so that the one end 14A of switch lever 14 comes into contact with the bottom surface of the contacting section 12C formed in the push rod 12. As a result, the same condition as in FIG. 4B is established.

As apparent from the above, the contacting section 12C formed in the push rod 12 compels the link L to rotationally move in the direction of the arrow C1, but does not compel the link L to rotationally move in the direction of the arrow C2. Therefore, even in case that the fuel lid 1 is closed by compulsion as shown in FIG. 4C, no excessive force is applied to the push rod 12, the link L, the cable 2, and the like.

Figure 6:
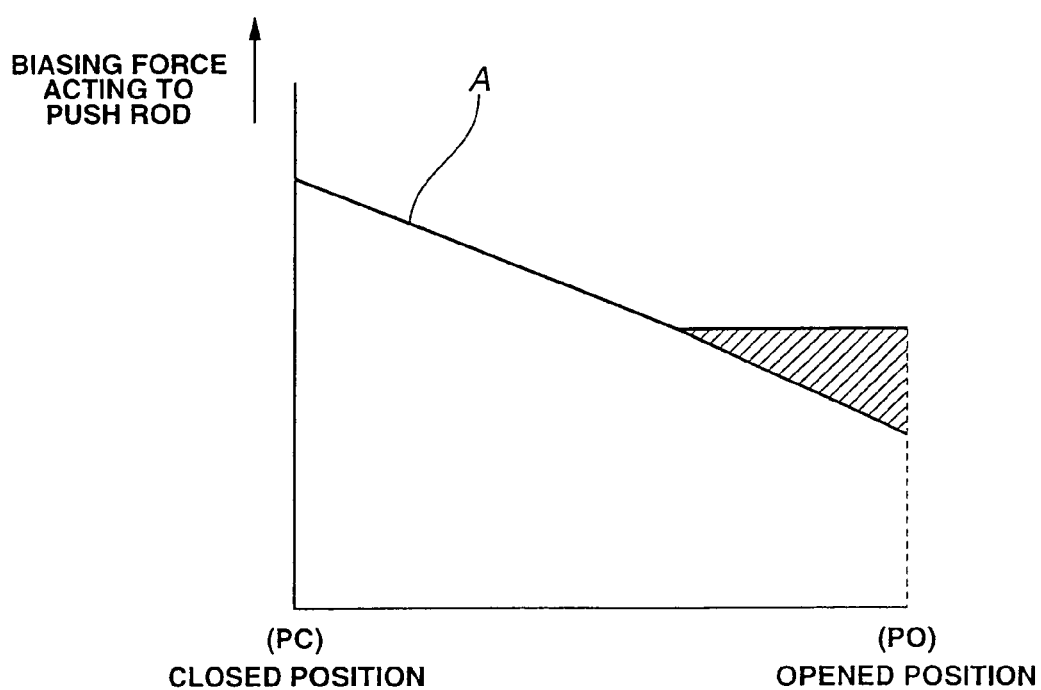
FIG. 6 is a graphical representation showing the relationship between a position of the push rod and a biasing force acting to the push rod in the fuel lid apparatus of FIG. 1.

In FIG. 6, a relationship between the position of the push rod 12 and the biasing force acting to the push rod 12 in the direction of the arrow B1 is represented by a line A.

The push rod 12 takes an extreme position which is reached upon displacement of the push rod 12 in the direction of the arrow B2 by closing the fuel lid 1 and referred to as "closed position (PC)" in connection with closing of the fuel lid 1, and an opposite extreme position which is reached upon displacement of the push rod 12 in the direction of the arrow B1 by opening the fuel lid 1 and referred to as "opened position (PO)" in connection with opening of the fuel lid 1. When the push rod 12 is moved to the closed position PC as shown in FIG. 4B, a deformation of the first spring 16 is maximized. Then, as the push rod 12 displaces toward the opened position PO in the direction of the arrow B1 upon opening of the fuel lid 1, the deformation amount of the first spring 16 is minimized. When the push rod 12 is moved to the opened position PO upon opening of the fuel lid 1 as shown in FIG. 4A, the deformation amount of the first spring 16 is minimized. As apparent from the line A in FIG. 6, the biasing force acting to the push rod 12 from the first spring 16 changes almost linearly and maximized at the closed position PC while minimized at the opened position PO, since the first spring 16 biases the push rod 12 by its elastic restoring force.

Figure 5A:
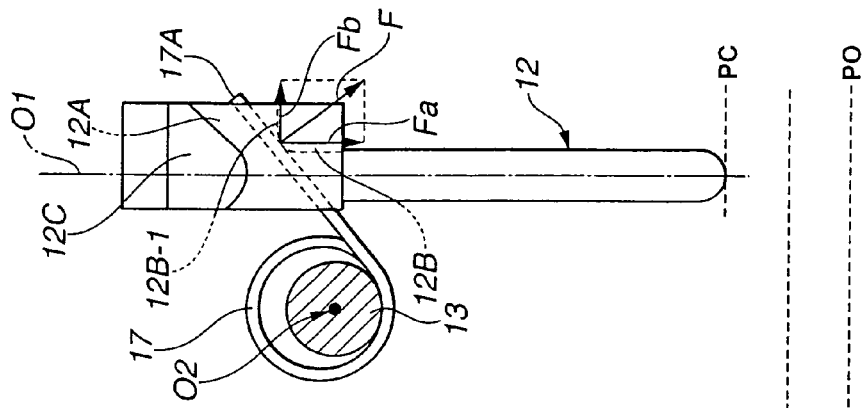
FIG. 5A is an explanatory view showing a locational relationship between a push rod and a second spring of the fuel lid apparatus of FIG. 1.
Figure 5B:
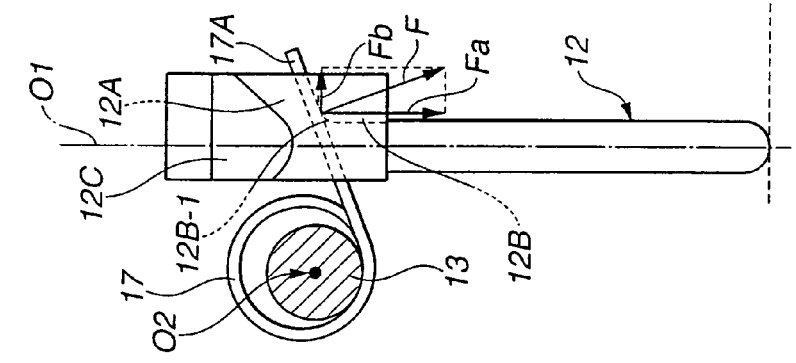
FIG. 5B is an explanatory view similar to FIG. 5A but showing another locational relationship.
Figure 5C:
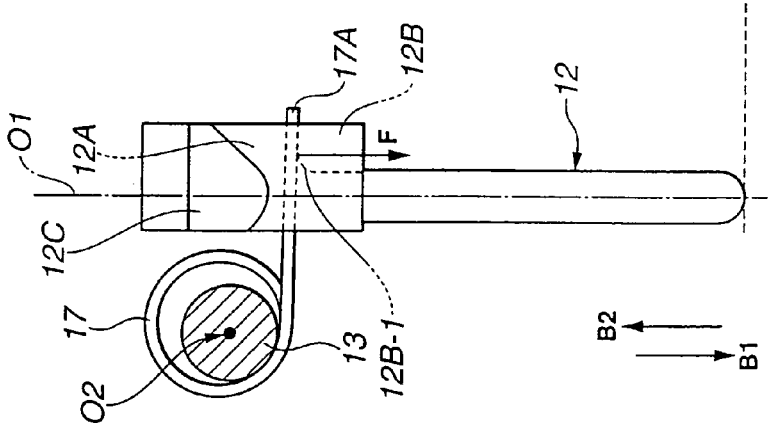
FIG. 5C is an explanatory view similar to FIG. 5A but showing further locational relationship.

Furthermore, during displacement of the push rod 12 between the opened position PO and the closed position PC, an angle formed between the one end section 17A of the second spring 17 and the contacting surface 12B-1 of the spring engaging section 12B varies as shown in FIGS. 5A–5C. Since the contacting surface 12B-1 is formed as the round surface, when the push rod 12 is at the closed position PC, a biasing force F is directed to the right and downward side in FIG. 5C. As the push rod 12 is displaced in the direction of the arrow B1, the direction of the biasing force F varies in order to approach the direction of the arrow B1 as shown in FIGS. 5A and 5B. When the push rod 12 is at the opened position PO as shown in FIG. 5A, the direction of the biasing force F is almost along the direction of the arrow B1.

Such biasing force F can be decomposed into a component force Fa directed in the direction of the arrow B1 and another component force Fb directed in the vertical direction of the arrow B1. The component force Fa directed in the direction of the arrow B1 increases as the push rod 12 is displaced from the closed position PC in FIG. 5C to the opened position PO in FIG. 5A. Meanwhile, due to a reaction force to the biasing force F, the one end 14A of the switch lever 14 is pressed onto the bottom surface of the contacting section 12C formed in the push rod 12 as mentioned above. Even if a major part of the biasing force F is exerted on the contacting section 12C formed in the push rod 12, the component force Fa which biases the push rod 12 in the direction of the arrow B1 tends to increase, as the push rod 12 is displaced from the closed position PC in FIG. 5C to the opened position PO in FIG. 5A. The biasing force of the first spring 16 which becomes the minimum at the opened position PO is supplemented with the biasing force F of the second spring 17 as indicated by a hatched area in FIG. 6.

In this way, the biasing force of the second spring 17 supplements the biasing force of the first spring 16 at the opened position PO, thereby obtaining a sufficient biasing force to open the fuel lid 1. This securely opens the fuel lid 1 when the lock (not shown) of the fuel lid 1 is released. Thus, the fuel lid 1 is securely opened with a sufficient power.

Additionally, the link L is composed of the switch lever 14 positioned on the one side of the main flat section 11a and the stopper lever 15 positioned on the other side of the main flat section 11a, in which the switch lever 14 and the stopper lever 15 are connected with each other as the single piece. Accordingly, the link L can be kept in a well-balanced condition so as not to be inclined, so that the link L can smoothly rotate. Moreover, by arranging the first spring 16 and the second spring 17 on the one and the other sides of the main flat section 11a, respectively, the biasing forces of them act on the link L with good balance, so that the link L can rotationally move more smoothly. Furthermore, an effective arrangement of the first and second spring 16 and 17 enables the fuel lid apparatus 10 to be small-sized.

Other embodiment of the fuel lid apparatus according to the present invention will be discussed.

The contacting arrangement of the one end section 17A of the second spring 17 and the spring engaging section 12B of the push rod 12 is not limited to that in FIGS. 5A to 5C. In the arrangement, it is essential that the angle formed between the one end section 17A of the second spring 17 and the contacting surface 12B-1 of the spring engaging section 12B varies in such a manner that the component force of the second spring 17 acting in the direction of the arrow B1 increases as the push rod 12 is displaced in the direction of the arrow B1. Besides, it is not necessary that the second spring 17 is the torsion spring. As appreciated from the above, according to the present invention, the fuel lid apparatus allows the fuel lid to forcefully and reliably open by varying the angle formed between the second biasing device and the push rod in such a manner that the component force of biasing force of the second biasing device acting in the displacement direction increases as the push rod is displaced in the direction to open the fuel lid. Additionally, an increase in number of component parts can be avoided because it is unnecessary to use two links which are relatively rotatable. Further, at least one of the contacting surfaces of the push rod and the second biasing device is formed a rounded surface, and therefore the angle smoothly varies according to the displacement of the push rod, thereby further reliably opening of the fuel lid. Furthermore, the first and second links are respectively located on the opposite sides of the base member, and therefore the link can be kept in a well balanced condition so as not to be inclined to the base member so that the link can smoothly rotationally moved. Moreover, the first and second biasing devices are provided respectively on the opposite sides of the base member, and therefore the link undergoes a well-balanced biasing force and can be rotationally moved more smoothly while the fuel lid apparatus itself can be small-sized.

The entire contents of Japanese Patent Application P2004-107843 (filed Mar. 31, 2004) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A fuel lid apparatus comprising:
   a push rod displaceable in a first direction by opening a fuel lid and in a second direction by closing the fuel lid;
   a first biasing device for biasing the push rod in the first direction;
   a link connected to a stopper and capable of moving the stopper to an engaging position by being rotationally moved in a third direction and to a non-engaging position by being rotationally moved in a fourth direction, the stopper being adapted to be engaged with a slide door to put the slide door at a partly or half opened position when the stopper is at the engaging position and to be disengaged from the slide door when the stopper is at the non-engaging position;
   a contacting section formed in the push rod and capable of being contacted with the link to rotationally move the link in the third direction when the push rod is displaced in the first direction; and
   a second biasing device disposed between the push rod and the link to bias the link in the fourth direction and to bias the push rod in the first direction,
   wherein the push rod and the second biasing device are in a locational relationship to increase a component force of a biasing force of the second biasing device in the first direction as the push rod is displaced in the first direction.

2. A fuel lid apparatus as claimed in claim 1, wherein the second biasing device includes an extended section which is engaged with an engaging section of the push rod, wherein an angle formed between axis of the extended section of the second biasing device and axis of the push rod changes in a manner that the component force of the biasing force of the second biasing device in the first direction increases as the push rod is displaced in the first direction.

3. A fuel lid apparatus as claimed in claim 2, wherein the push rod includes an engaging section to which the extended section of the biasing device is engaged, wherein the engaging section has a contacting surface with which the extended section of the biasing device is contactable, at least one of a surface of the engaging section of the push rod and the contacting surface of the engaging section is rounded.

4. A fuel lid apparatus as claimed in claim 3, wherein the at least one of the surface of the engaging section of the push rod and the contacting surface of the engaging section is formed as a generally semicylindrical surface.

5. A fuel lid apparatus as claimed in claim 1, wherein the link is rotatably and pivotally supported on a base member and includes a first link and a second link which are fixedly connected as a single piece,
   the first link having an arm section contactable with the contacting section and positioned on one side of a main section of the base member, the second link having an arm section connected to the stopper and positioned on the other side of the main section of the base member.

6. A fuel lid apparatus as claimed in claim 5, wherein the first biasing device and the second biasing device are disposed on opposite sides of the main section of the base member, respectively.

* * * * *